April 1, 1941.   N. A. MONFILS   2,236,547
GROOVING MACHINE
Filed May 20, 1938

INVENTOR
Napoleon A. Monfils
By his attorney
Victor Cobb

Patented Apr. 1, 1941

2,236,547

UNITED STATES PATENT OFFICE 2,236,547

GROOVING MACHINE

Napoléon A. Monfils, Haverhill, Mass., assignor to United Shoe Machinery Corporation, Borough of Flemington, N. J., a corporation of New Jersey Application May 20, 1938, Serial No. 209,095

6 Claims. (Cl. 12—40)

This invention relates to grooving machines and is herein illustrated as embodied in a machine for cutting parallel grooves in the forepart of a sole transverse to its length to increase the flexibility of that part of the sole.

The general object of this invention is to provide an improved machine by the use of which certain types of insoles and outsoles may be accurately and rapidly grooved. In the illustrated machine a rapidly rotated cutter-head is provided with peripheral milling teeth adapted to feed the work over a work table, and the latter is so proportioned and mounted as to enable the operator to grasp both faces of a work-piece with each hand, one at each side of the grooving locality, without distorting the work-piece, and thus control not only the presentation of the work to the cutter-head but also the speed with which the work is fed by the cutter-head.

These and other features of the invention including certain details of construction and combinations of parts will be described as embodied in an illustrated machine and pointed out in the appended claims.

Referring to the accompanying drawing.

Figures 1, 2, 3, 4:
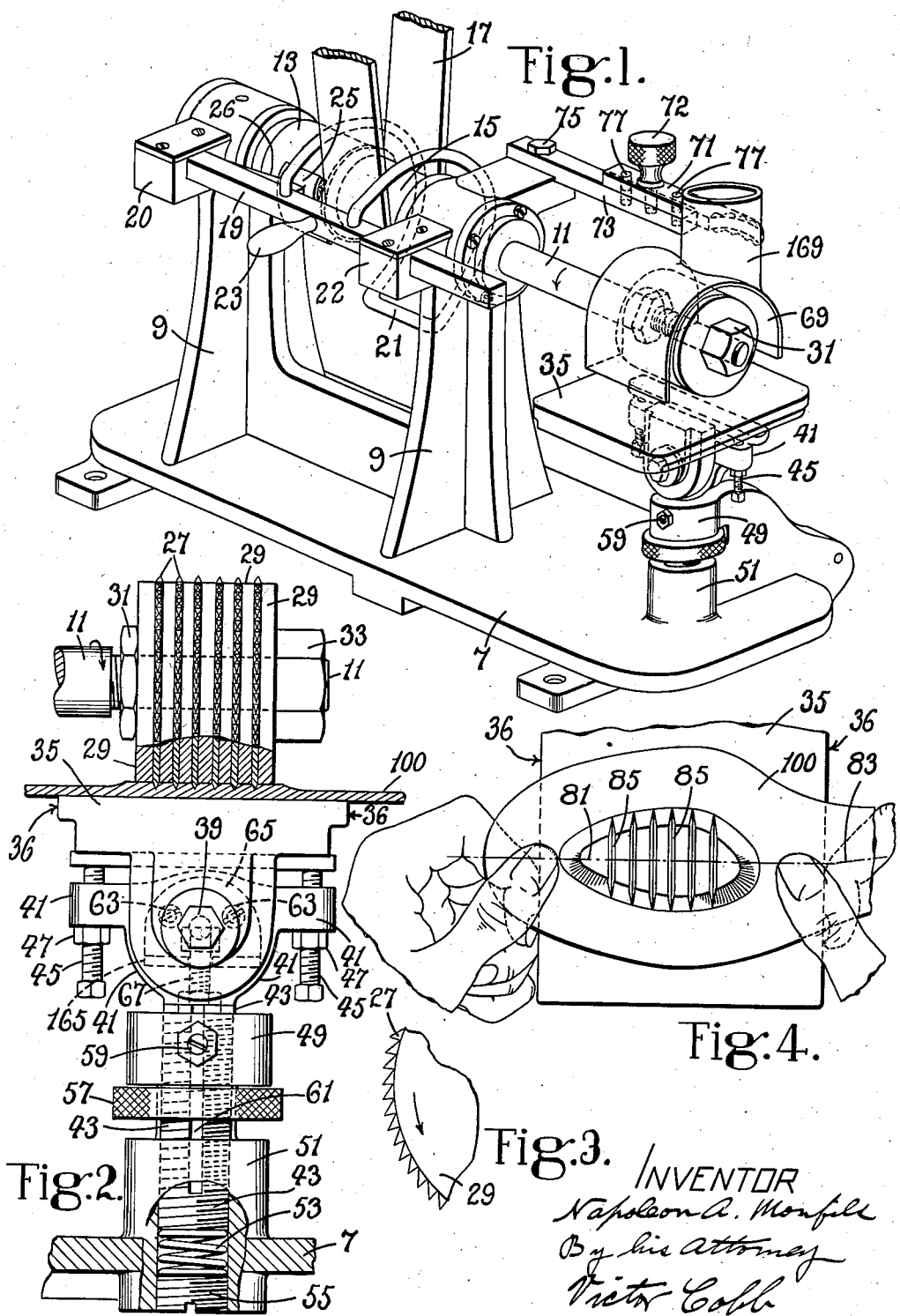
Fig. 1 is a perspective of a machine in which the present invention is embodied.
Fig. 2 is a view on an enlarged scale, principally in elevation, of a portion of the machine, a piece of work in process of being operated upon and a portion of the cutter-head being shown in cross section.
Fig. 3 is an elevation on a still more enlarged scale of a portion of one of the cutters.
Fig. 4 is a plan of the work table, and the forepart of a sole in process of being guided over the table by the operator.

The machine comprises a base 7 having spaced upright standards 9, in alined bearings in which is rotatably mounted a shaft 11 to which a pulley 13 is fast. A second pulley 15, loose on the shaft, is located beside the fast pulley 13; and a driving belt 17 may be shifted from one pulley to the other by a belt-shifter comprising a slide bar 19, a belt engaging member 21, and an operating handle 23. The bar 19 is arranged to slide in bearings 20, 22. When the parts are in the positions shown in Fig. 1 with the belt 17 on the loose pulley 15, a brake shoe 25 engages the pulley 13. The shoe 25 is carried by an arm 26 mortised into the bar 19 and pivotally connected to the left-hand end of the latter. A spring (not shown) between the bar and the arm applies the brake except when the bar is shifted to the left. The brake-arm is then pressed into the bar 19 by the bearing 20.

Mounted in the outer end of the shaft 11 at a considerable distance from the nearer one of the two standards 9 is a cutter-head in the form of a cylinder but having spaced series of milling teeth 27 of V-cross section on its periphery. In the illustrated construction the teeth 27 are formed on thin circular disks interposed between clamping disks 29 having smooth and polished concentric peripheries beyond which only the teeth 27 project. This assemblage of cutting disks and smooth disks is secured on a screw-threaded portion of the shaft 11 by clamping nuts 31 and 33. The peripheries of the disks 29 constitute the hub of the cutter head and are arranged to engage the upper face of a sole and thereby limit the depth of penetration of the teeth 27 into the sole without preventing the depth to be otherwise limited by adjusting the work-supporting table 35 hereinafter described.

The work is held up against the milling teeth 27, and in some cases also against the disks 29, by a narrow work table or support 35 having side edges or faces 36 parallel to the path of work-feeding movement, said table also having an ear on its under side to receive a horizontal cap-screw 39 by which the table is clamped against a member 41. This provides for angular adjustment of the table to place its upper surface parallel with the bottoms of the disks 29. In order to adjust the table about the axis of the cap-screw 39, two opposed adjusting screws 45 are screwed through lugs on the member 41 and act against the under side of the table, check nuts 47 being provided to hold the adjusting screws in adjusting position.

The illustrated outsole 109 is of the type which has a mound on the foot side of its forepart, and the primary purpose of the illustrated machine is to cut grooves 85 across this mound from side to side as illustrated in Fig. 4, without cutting grooves in the margins beyond the mound. For the best results the extent of projection of the teeth 27 beyond the disks 29 should be slightly less than the extent to which the mound of the sole projects above the margins of the sole.

A stem 43, which is integral with the member 41, is vertically slidable in smooth alined bores in spaced bearing members 49, 51 which are integral with the base. The stem rests upon a compression spring 53 which in turn rests upon an adjustable screw-plug 55. The stem 43 is threaded and provided with an adjusting nut 57 which is located between the bearings 49, 51.

These are spaced to permit limited up and down movement of the nut and the work table. A small screw 59 threaded in the wall of the bearing 49 projects into a vertical groove 61 in the stem 43 and serves as a spline to prevent the stem from turning. With this construction, the initial level of the table may be regulated by merely turning the nut 57. In order to ensure that the table shall in no case rise far enough to contact with the teeth of the cutter head, a plate 65 is fastened by screws 63 (Fig. 2) to the member 41, and a projecting lip 165 of this plate is arranged to underlie a stop shown as the head of a cap-screw 67. This cap-screw is affixed to a portion of the frame. Extending over the cutter-head is a combined dust hood, chip deflector and finger guard in the form of a hollow half-cylinder 69, and having a spout 169 to which a pneumatic suction pipe may be coupled to remove dust and chips. This guard is fastened to a bar 71 which is detachably secured to a supporting bar 73 by a screw 72 and dowels 77. The bar 73 is affixed to the frame by a cap-screw 75.

The width of the table is such that the toe end and the shank of a sole may both project beyond the side edges 36 to be grasped with thumb and forefinger, each hand of the operator being provided with a free and unobstructed space, one at each side of said table. The work may therefore be grasped by its upper and lower faces, as shown in Fig. 4, at two separate localities one at each side of the portion to be grooved, and while so held may be presented to the cutter-head with the forefingers of the operator in engagement with and guided by the sides 36 of the table, the operator controlling the work so as to retard its progress as the work is seized by the teeth 27 of the cutter-head and fed over the table. With the illustrated construction the operator may readily present a sole to the machine, regardless of whether it is a right or a left sole, and guide it so that the grooves shall be cut at right angles to the median line 81 of the forepart (Fig. 4) regardless of the median line 83 of the shank which, in many styles, is not strictly in line with that of the forepart.

In practice, the nut 57 should be turned to adjust the table 35 to a level at which the margins of a sole lying thereon will barely clear the teeth 27. Consequently, the mound or high portion of a sole will be the only portion on which the teeth will operate. Obviously, when the mound is within the range of the teeth the latter will feed the sole, but since unobstructed spaces are provided for the operator's hands beyond the opposite edges 36 of the table he may grasp the outboard portions at these two points to retain control of the sole and retard its feeding movement enough to insure an overrunning travel of the teeth. As the thickest part of the mound runs under the smooth disks 29 it is slightly depressed by them, and the sole then depresses the table against the force of the compressed spring 53. At this stage the thick portion of the sole is pressed with considerable force against the table by the disks 29, and the friction thus developed between the sole and the table assists the operator in retarding the feeding movement of the sole.

The illustrated machine may also be used to cut corresponding grooves in a skeleton insole (not shown) that has been split from an outsole 100 and provided with an opening complemental to the mound of the outsole. Since the thickness of the insole is only as great as the height of the mound of the outsole, the grooves to be cut in the insole will not be so deep as those cut in the outsole. For insole-grooving it is only necessary to adjust the nut 57 to permit the compressed spring 53 to raise the work-table to the desired level, and present the insole to the cutter-head in the same manner as that described above for outsole grooving. Under these conditions the depth-gages 29 will not touch the work, but the depth of the grooves will be controlled by the work-table.

The lower edges of the guard 69 are far enough above the table to clear the thickest part of an outsole, yet not so far as to permit the operator to thrust a finger within range of the cutter-head.

Having thus described my invention, what I claim as new and desire to secure by Letters Patent of the United States is:

1. A grooving machine comprising a rotary power-driven cutter-head having peripheral milling teeth, a work-supporting table confronting said teeth, said table being movable in operation toward and from the cutter-head, resilient means by which the table is normally urged toward the cutter-head, and one or more depth gages the work-engaging surfaces of which are adjacent to said teeth and located at a distance from the rotational axis of said cutter head no less than that of the roots of said teeth.

2. A machine as defined in claim 1, in which the cutter-head comprises one or more operating disks having grooving teeth and one or more other disks having smooth concentric peripheral surfaces arranged to bear on the work at a distance from the rotational axis of the cutter head no less than that of the roots of said teeth.

3. A machine for cutting grooves in a piece of work to increase its flexibility having, in combination, a cutter-head comprising a smooth cylindrical hub having spaced rows of milling teeth projecting beyond its periphery, the depth of said teeth being as great as their extent of projection beyond said periphery, a table arranged to support the work against said milling teeth, and means for rotating the cutter-head in a direction to groove the work and feed it over the table.

4. A machine for grooving shoe-soles comprising a work-supporting table having parallel side edges spaced from each other a distance such that the toe portion and the shank portion of a shoe-sole may project beyond them to be grasped manually while the ball-area of the sole lies on the table, there being an unobstructed space along each side of said table of sufficient area to enable an operator's hands to flank the table and grasp the toe portion and the shank portion of the sole located as aforesaid, and a rotary power-operated cutter head having one or more series of milling teeth arranged to cut grooves in the upper surface of the work lying on said table.

5. A rotary cutter head comprising a shaft, a circular cutting disk carried by said shaft, gages arranged on said shaft at opposite sides of and adjacent to said cutting disk, said gages having smooth peripheral surfaces concentric to said disk and arranged to bear on the upper surface of the work, said cutting disk having peripheral milling teeth of V-cross-section the points of which lie in a circle outside the peripheral surfaces of said gages and the roots of which lie in a circle no larger than said surfaces.

6. A grooving machine comprising a work-supporting table, a drive shaft, fixed bearings in which said shaft is journaled, a circular cutting disk carried by said shaft, and a gage arranged on said shaft adjacent to said cutting disk, said gage having a smooth peripheral surface concentric to said disk and arranged to bear on the upper surface of the work, said cutting disk having peripheral milling teeth of V-cross-section the points of which lie in a circle outside the peripheral surface of said gage and the roots of which lie in a circle no larger than that surface.

NAPOLÉON A. MONFILS.